United States Patent [19]

Mizoguchi et al.

[11] 3,903,125

[45] Sept. 2, 1975

[54] PROCESS FOR PREPARING AROMATIC ISOCYANATE

[75] Inventors: Yoshiyuki Mizoguchi; Syohachi Ono; Toshiyuki Iwaisako, all of Tokyo, Japan

[73] Assignee: Asahi Kasei Kogyo Kabushiki Kaisha, Osaka, Japan

[22] Filed: Dec. 27, 1973

[21] Appl. No.: 428,898

[30] Foreign Application Priority Data
Jan. 10, 1973  Japan................................. 48-5265

[52] U.S. Cl......... 260/453 PC; 252/429 R; 252/430
[51] Int. Cl.²........................................ C07C 118/06
[58] Field of Search............................. 260/453 PC

[56] References Cited
UNITED STATES PATENTS
3,576,835  4/1971  Smith et al.......................... 260/453
3,812,169  5/1974  Hammond et al. ................. 260/453

Primary Examiner—Elbert L. Roberts
Assistant Examiner—Dolph H. Torrence
Attorney, Agent, or Firm—Armstrong, Nikaido & Wegner

[57] ABSTRACT

A one-step process for the industrial production of aromatic isocyanate in high yield is provided. Aromatic nitro compound is reacted with carbon monoxide at an elevated temperature under high pressure in the presence of solvent by using the catalyst of chlorides of palladium and/or rhodium or the complex thereof, and pyridine in the amount not less than 4 mols based on 1 mol of said metal element. The resulting product is useful intermediate for producing urethanes, carbamic acid derivatives and pharmaceuticals.

6 Claims, 1 Drawing Figure

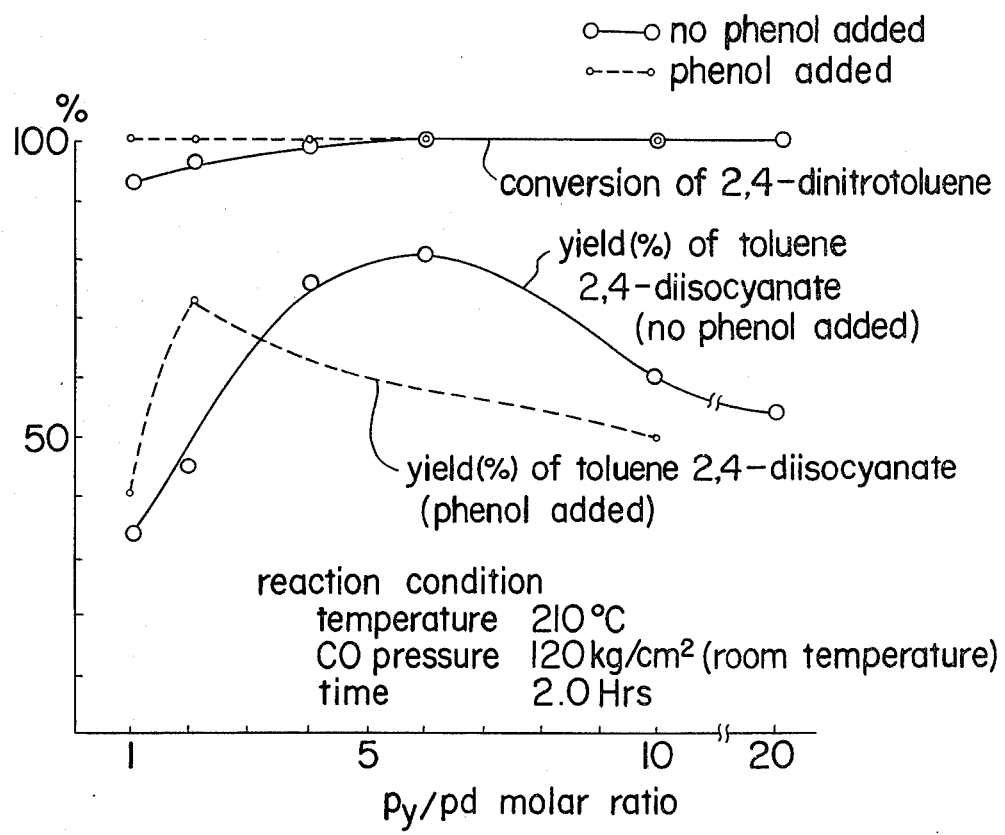

PROCESS FOR PREPARING AROMATIC ISOCYANATE

BACKGROUND OF THE INVENTION

Organic isocyanates are popular intermediates widely used in various commercial fields such as foams, adhesives, coverings, and fibers all as a form of urethanes; carbamic acid derivatives and pharmaceutical preparation.

As regards the production method of isocyanates, various processes are heretofore known. One of the conventionally established methods is so called aminephosgene which comprises preparing amine from corresponding nitro compounds of nitrile compounds and then subsequently reacting thus prepared amine with phosgene. However, this method includes many defects such as complexity of the process itself and the use of heavily toxic phosgene, and therefore improvement has been desired from the commercial view point.

In order to satisfy the commercial feasibility, a method in which organic nitro compound was reacted with carbon monoxide to obtain isocyanate was proposed. Namely, British Patent No. 1080094 disclosed a process in which urethane is prepared from nitro compound, carbon monoxide and alcohol in the presence of combination catalyst of palladium, iridium, rhodium or nickel compound, and heavy metal compounds at a temperature of 100 – 175C. Further, British Patent No. 1025436 discloses a process for preparing isocyanate by using chlorides of rhodium, palladium, iridium or osmium. DOS (German Patent Unexamined) Nos. 2005810, 2005811, 2005812 and 2011809 disclose a process wherein precious metal, amide, nitroso, nitrile and amino compound are added to the catalyst system. Japanese Patent Publication 5721/1968 discloses the catalyst of precious metal and Lewis acid compound. DOS. No. 2011810 aiming the enhancement of the yield discloses a process wherein isocyanate is prepared by adding alcohol in the presence of catalyst system of precious metal, Lewis base and the compound of Va and VIa group compound. In this DOS phenol as alcohol is added in the presence of catalyst system of pyridine/palladium being 2 mol.

In all of the above mentioned methods, high pressure and a temperature of from 25C – 250C are required as a reaction condition. In addition, due to the use of phenol, there occur many problems such as corrosion of the reactor, formation of carbamic acid by the reaction of phenol and isocyanate, recovery of phenol, etc. The most serious drawback of these known methods resides in the features of low yield of the isocyanate which cannot justify the feasibility of the process for a commercial scale.

The present inventors made an extensive study on the catalyst system and the reaction conditions in order to solve the above mentioned problems and finally the present inventors reached the invention which attained high yield and high selectivity.

BRIEF SUMMARY OF THE INVENTION

The present invention relates to an improved process in preparing aromatic isocyanate by catalytic reaction of aromatic nitro compound with carbon monoxide at an elevated temperature under high pressure, which process is characterized by effecting the reaction in the presence of solvent at a temperature of 200 – 250C by using the catalyst of chlorides of palladium and/or rhodium or the complex thereof, and pyridine in the amount of not less than 4 mols based on 1 mol of said metal element, and which process enables to obtain the isocyanate in a greatly enhanced yield. Due to the simplicity of the reaction system using nitro compound, carbon monoxide, solvent, metallic chloride and pyridine according to the present invention, various advantages such as to produce isocyanate in a very low cost, to avoid corrosion of the reactor at the time of the phosgene production, or to ensure no pollution processes, are attained according to the present invention, which advantages could never be attained according to the conventional phosgene production process by reacting amine compound with phosgene.

Comparing to the known processes as disclosed in the afore-said patents, the present invention shows 100% of nitro compound conversion and 70% – 85% of yield of the corresponding isocyanate, the results of which are far superior to those of the known processes. Further, according to the present invention, the composition of the reaction product in the resultant reaction liquid is 100% in the isocyanate and other unknown impurities, if present, do not adversely affect separation by distillation.

In the present invention, metallic chloride which greatly influences the cost of the isocyanate production forms complex with pyridine and thus resultant complex can be recovered in a form of needle-like crystal and can be repeatedly used by recycle.

Usually in order to effect the carbonylation reaction it is required to use, due to extreme corrosion, the reactor coated by silver, aluminum or copper. However, according to the present invention, it is possible to use a stainless steel reactor.

As mentioned above, the present invention possesses many advantages comparing to the known methods and enabled commercially feasible production of aromatic isocyanate.

BRIEF DESCRIPTION OF THE DRAWING

The drawing shows the schematic result of Examples 5 – 8 in comparison with Control 1 – 7. The figure shows molar correlation between pyridine and palladium in terms of conversion and yield.

DETAILED DESCRIPTION OF THE INVENTION

For the aromatic nitro compound employed in the present invention, any aromatic nitro compound used in the conventional processes can be employed as a starting material of the present invention. Namely, aromatic mono- or poly-nitro compound or the substitutes thereof can give in high yield corresponding mono- or poly-isocyanate by the reaction according to the present invention. Typical examples of aromatic nitro compounds which can give isocyanate by the reaction with carbon monoxide are nitro benzene, nitro naphthalene, nitro anthracene, nitro biphenyl, bis(nitrophenyl)methane, bis(nitrophenyl) ethane, bis(nitrophenyl)ether, bis(nitrophenyl)sulfone, nitro phenotheazine, nitro phenoxyalkane and substituted compound of the said aromatic nitro compound which are substituted by at least one of nitro group, nitro alkyl group, isocyanate group, alkyl group, alkenyl group, alkoxy group and halogene. Further, it is also possible to use isomer or isomeric mixtures of said aromatic nitro compounds and substituted aromatic nitro compounds. Aromatic nitro compounds preferably employed for the present invention are mono- or poly-nitrated nitro benzenes and isomeric mixtures thereof: nitro alkyl benzene and isomeric mixtures thereof; and bis(nitrophenyl) alkyl and isomeric mixtures thereof.

The catalyst system employed for the present invention is the mixture of pyridine and chloride of palladium or rhodium, or the mixture of pyridine and the complex of said metal. The catalyst may be prepared by separately adding metallic compound and pyridine to the reaction system, or by adding mixture thereof to the reaction system. Further, the complex prepared by the conventionally known method can be used as a metallic compound or pyridine.

For the chlorides of palladium or rhodium, palladium dichloride, rhodium trichloride or the hydrate thereof treated in suitable manner can be used. Further, the oxides or the chlorides prepared from metal by a various method can be used.

The amount of pyridine is especially important factor in the present catalyst system and the presence of pyridine required is not less than 4 mols based on said metal. Pyridine contained in the complex can be taken into account for the amount of pyridine required, and usually the amount of 4 – 20 times of mols, particularly 4 – 9 times of mols, is preferable. Employment of the amount below not more than 4 times, results in remarkable decrease particularly in isocyanate yield and therefore is not suitable for the present invention. For example, palladium complex containing 2 mols of pyridine [$Pd(Py)_2Cl_2$] as catalyst, as starting nitro benzene as starting material, and 1,1,2-trichloro-1,2,2-trifluoroethane as solvent were charged in a 120 ml. of stainless steel (SUS 32) reactor and the reaction was effected at a temperature of 190C and at a CO pressure of 120 Kg/cm$^2$ (calculated by room temperature) for 2 hours. The result showed the conversion of nitro compound was 100% and the yield of phenyl isocyanate was as low as 33.7%. In this example only poor result was obtained, whereby coagulated by-product was adhered to the wall of a reactor. Proposed improvement (German Patent 2011810) for solving this problem, wherein alcohols are added to the reaction system, still gives only a poor result of conversion of nitro form being 96%, diisocyanate yield being 25.0% and the yield including monoisocyanate being 52.3%. Further, this improvement was unsatisfactory because the reaction liquid is viscous and corrosion of the reactor occurs.

The present invention will be further explained by the drawing of the invention. The drawing shows the results of Example 5 – 8 and Controls 1 – 7. The abscissa shows the molar ratio of pyridine and palladium and the ordinate shows conversion of 2,4-dinitro toluene and the yield of toluene-2, 4-diisocyanate.

The drawing clearly shows the difference in the result between the effects by addition and non-addition of alcohols (phenol). Namely, in case phenol is added, the highest yield can be obtained at a molar ratio of pyridine to palladium being 2:1. But, the range suitable for the present invention is not less than 4 times of mols.

Namely, the catalyst system according to the present invention enables to attain higher yield (more than 70%) of organic isocyanate and to employ the simplified catalyst system, thereby making ready recovery of the catalyst. Further in the present invention, it is meaningless to add oxides of Group VB- and VIB-metals to the reaction of the present invention, because the addition merely causes decrease in yield, promotion of by-reaction, and complexity of catalyst recovery.

The amount of palladium or rhodium compounds based on starting aromatic nitro compound is not less than 0.01% by weight and preferably from 0.1% by weight to 20% by weight.

The catalyst can be used alone in self-supporting form or with carrier by, for example, immersion method.

In practising the present invention, it is preferable to use the solvent. Suitable solvents include monochloro benzene, dichlorobenzene, monochloro toluene, trichloro ethane, tetrachloro ethane, trichloro trifluoro ethane and perchloro ethylene; aromatic hydrocarbons such as benzene, toluene and xylene; and mixture thereof. Particularly preferable solvents are aromatic hydrocarbon and halogenated hydrocarbon, for example mono- and poly-chloro benzene, benzene, toluene, etc.

As regards the ratio of solvent to starting aromatic nitro compound, any ratio can be employed as long as the facilities do not become too large.

Carbon monoxide used for the reaction is charged with the pressure of 40 – 200 Kg/cm$^2$ into an autoclave. The reaction with a pressure not more than 40 Kg/cm$^2$ necessitates higher temperature and longer reaction time for proceeding the reaction and therefore disadvantageous for the production of isocyanate. Further, a reaction with the pressure more than 200 Kg/cm$^2$, though the reaction itself can take place, is not preferable because the use of highly pressure resistant reactor is necessitated.

In practice, according to the present catalyst system, reaction can be proceeded at a pressure below 200 Kg/cm$^2$. Carbon monoxide can be charged continuously or intermittently as the reaction proceeds by increasing the temperature.

The present reaction proceeds assumingly by the following reaction formula:

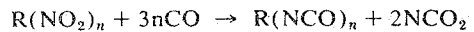

$$R(NO_2)_n + 3nCO \rightarrow R(NCO)_n + 2NCO_2$$

The amount of carbon monoxide necessitated in the reactor room is 3 times of mols based on nitro group, and for practising the invention it is preferable to charge 5 – 10 times of mols. There is no upper limit for the amount.

Carbon monoxide other than that consumed for the present reaction can be circulated by a suitable means for re-use.

In the present invention, reaction temperature is particularly important factor. Namely, the temperature below 200C promotes the side reaction, lowers the yield and selectivity, and accordingly tends to increase the reaction residue. (Confer Control 8). Increase of the reaction residue is unfavorable, because the residue causes adhesion to the wall of the reactor and makes it impossible to conduct a continuous reaction, to recover the starting materials and to separate the product. Further, in the range above 250C, the purpose of the invention can not be attained, because of decomposition of the produced isocyanate, and decrease of yield and selectivity.

The suitable range of the reaction temperature varies according to the kind and the reactivity of aromatic nitro compounds to be employed, each of which has different reactivity and the produced corresponding isocyanates having different thermal resistance, and usually a temperature of 200 – 250C, preferably 200 –

240C is employed with the use of exterior or interior heating apparatus.

The reaction time varies with the kind of aromatic nitro compound to be employed for the reaction, the catalyst system and the amount thereof, solvent and effect of agitation of the reactor. In a batch-wise process, suitable reaction is from 20 minutes to 4 hours. But, shorter or longer reaction times do not adversely affect the reaction.

For the present invention, the reaction can be effected either batch-wise or continuously.

Up to now, it is not clear in what forms the present catalyst system with Py/Pd ≧ 4 mol works. Further, the working mechanism is not clear. Assumingly, the complex of palladium-pyridine-chlorine becomes in a most suitable state at the time of interaction of nitro compound with carbon monoxide and during the coming-off stage of isocyanate, thereby surpressing the formation of other compound and increasing the yield of the present product.

Comparing to the known patents, the present invention gives higher yield of the isocyanate and the product in a liquid detected by gaschromatography is solely isocyanate and as a consequence separation and purification can be simplified.

Since no addition of phenol etc. is made in the present invention, there is neither formation of carbamic acid nor corrosion of the reactor.

Metallic chlorides which greatly affect the production cost of the isocyanate, form the complex with pyridine. The complex can be recovered in a form of needle-like chrystal and can be reused by recycle.

In summary, the method according to the present invention has many advantages to enable the low cost production of isocyanate and therefore can be employed as a commercially feasible process for producing the aromatic isocyanate in a large scale.

EXAMPLE 1

Into a 500 ml. stainless steel (SUS 32) autoclave equipped with a magnetic stirrer, there were charged 50.0 g. of nitro benzene, 1.9 g. of palladium dichloride, 3.4 g. of pyridine and 125 g. of monochloro benzene as a solvent and then carbon monoxide with the pressure approximately of 120 Kg/cm$^2$ at room temperature was filled. The amount of palladium is 0.025 time of mol based on the starting compound and the amount of pyridine is 4 times of mols based on palladium compound. Under stirring at 800 – 1000 rpm by a magnetic stirrer, the temperature was increased to 210C over a period of 30 minutes and then by maintaining this temperature the reaction was effected. Maximum gauge pressure during the reaction was 200 Kg/cm$^2$. After cooling the reactor to room temperature, the reaction liquid was taken out and the conversion of benzene and the yield of the product was calculated by gaschromatography analysis using biphenyl as an internal standard. The conversion of nitrobenzene was 100% and the yield of the phenyl isocyanate was 78.1%.

EXAMPLE 2

The same procedure as in Example 1 was followed, except that 10.9 g. of 2,4-dinitro toluene, 1.6 g. of palladium chloride, 4.2 g. of pyridine (Py/Pd = 6 times of mols) and 150 g. of o-dichloro benzene as a solvent were charged. The conversion of 2,4-dinitro toluene was 100% and the yield of toluene-2, 4-diisocyanate was 80.9% based on consumed dinitro toluene.

EXAMPLE 3

Into a 120 ml. stainless steel (SUS 32) autoclave there were charged 6.0 g. of nitro benzene, 0.5 g. of rhodium trichloride, 0.8 g. of pyridine and 30 g. of trichloro benzene (the amount of rhodium based on nitro benzene is 5 mol %, and the amount of pyridine is 4 times of mols based on rhodium), and then carbon monoxide with the pressure of 120 Kg/cm$^2$ was filled. The reaction was effected for 1.5 hours under stirring by a shaking apparatus with oil bath maintained at 200C (the amplitude being 20 cm; rotation being 40 cycles per minute). The reaction liquid was treated and analyzed as in Example 1. The conversion of nitro benzene was 100% and the yield of phenyl isocyanate was 74.5%.

EXAMPLE 4

The same procedure as in Example 3 was followed, except that 1.1 g. of 2,4-dinitro toluene, 0.16 g. of palladium dichloride, 0.28 g. of pyridine (Py/Pd = 4 times of mols) and 15 g. of benzene as a solvent were charged and the reaction was effected by using a shaking apparatus with oil bath maintained at 230C. The conversion of 2,4-dinitro toluene was 100% and the yield of toluene-2,4-diisocyanate was 73.5%.

EXAMPLE 5 – 8

Into a 120 ml. stainless steel (SUS 32) autoclave, there were charged 1.1 g. of 2,4-dinitro toluene, 0.16 g. of palladium dichloride, 15.0 g. of o-dichloro benzene and 4, 6, 9, or 20 times respectively of mols of pyridine based on palladium, and then carbon monoxide with the pressure of 120 Kg/cm$^2$ at room temperature was filled. Then the reaction was effected by using a shaking apparatus with oil bath maintained at 210C (the amplitude being 20 cm; rotation being 40 cycles per minute). The reaction liquid was treated and analyzed as in Example 1. As a result, the conversion and the yield were as follows. The result was shown in the drawing.

| Example | Pyridine/Palladium molar ratio | 2,4-dinitrotoluene Conversion (%) | Toluene-2,4-diisocyanate Yield (%) |
|---------|-------------------------------|-----------------------------------|------------------------------------|
| 5 | 4 | 100 | 75.1 |
| 6 | 6 | 100 | 81.0 |
| 7 | 9 | 100 | 60.8 |
| 8 | 20 | 100 | 55.0 |

It can thus be seen from the drawing that when the molar ratio of pyridine to palladium ranges from 4 moles to 8 moles of pyridine per mole of palladium, the yield of toluene-2,4-diisocyanate is in excess of 70%.

CONTROL 1

Into a 120 ml. of stainless steel (SUS 32) autoclave, 1.1 g. of 2,4-dinitro toluene, 0.16 g. of palladium dichloride, 0.14 g. of pyridine and 15.0 g. of o-dichloro benzene (the amount of palladium being 15 mol % based on 2,4-dinitro toluene; the amount of pyridine being 2 times of mols based on palladium), and then carbon monoxide with the pressure of 120 Kg/cm$^2$ at room temperature was filled. The reaction was effected for 2.0 hours under shaking by using a shaking apparatus with oil bath maintained at 210C (the amplitude being 20 cm; rotation being 40 cycles per minute). After cooling the reactor to room temperature, the reaction liquid was taken out and the conversion of 2,4-dinitro toluene and the yield of the reaction product was calculated by gaschromatography analysis using biphenyl as an internal standard. The conversion was 96.0%, the yield of toluene-2,4-diisocyanate was 45% and the yield of mono isocyanate was 25%. The result was shown in the drawing.

CONTROL 2

The same procedure and the same reaction condition as in Control 1 were followed except that the amount of pyridine employed is equal mol to that of palladium. The conversion of 2,4-dinitro toluene was 92.5% and the yield of toluene-2,4-diisocyanate was 34.0%. The result was shown in the drawing.

CONTROL 3 – 7

Into a 120 ml. of stainless steel (SUS 32) autoclave, there were charged 1.1 g. of 2,4-dinitro toluene, 0.16 g. of palladium dichloride, 15.0 g. of o-dichloro benzene, 4.36 g. of phenol (phenol/2,4-dinitro toluene = 7.72 times of mols) and 1, 2, 4, 6, or 9 times respectively of pyridine based on palladium, and then carbon monoxide with the pressure of 120 Kg/cm$^2$ at room temperature was filled. The reaction was effected for 2.0 hours under shaking by using a shaking apparatus with oil bath maintained at 210C (the amplitude being 20 cm; rotation being 40 cycles per minute). The reaction liquid was treated and analyzed as in Control 1. As a result, the conversion and the yield of the reaction product were as follows. The result was shown in the drawing.

room temperature was filled. The reaction was effected for 3.0 hours under shaking by using a shaking apparatus with oil bath maintained at 190C (the amplitude being 20 cm; rotation being 40 cycles per minute). After cooling the reactor to room temperature, the reaction liquid was taken out and the conversion of 2,4-dinitro toluene and the yield of the reaction product was calculated by gaschromatography analysis using biphenyl as an internal standard. The conversion was 92.5%, the yield of toluene-2,4-diisocyanate was 15.5% and the yield of toluene-mononitro, monoisocyanate was 25.7%.

What is claimed is:

1. In a process of preparing an aromatic isocyanate by reacting an aromatic nitro compound with carbon monoxide under pressure at an elevated temperature in the presence of a catalyst, the improvement comprising conducting the reaction in the presence of an aromatic hydrocarbon or halogenated hydrocarbon solvent at a temperature of 200–250C under the pressure of carbon monoxide charged at room temperature of 40–200 kg/cm$^2$ in the presence of a catalyst consisting of a chloride of a metal selected from the group consisting of palladium and rhodium, and pyridine, the metal chloride and pyridine being present either as a mixture or in the form of a complex and the pyridine being present in an amount ranging from 4 moles to 8 moles based on 1 mol of said metal element.

2. A process according to claim 1 wherein the reaction is effected at a temperature of 200 – 240C.

3. A process according to claim 1, wherein the amount of palladium compound or rhodium compound is not less than 0.01% by weight based on aromatic nitro compound.

4. A process according to claim 1, wherein the amount of palladium compound or rhodium compound is 0.1 – 20% by weight based on aromatic nitro compound.

5. A process according to claim 1, wherein one or mixture of monochloro benzene, dichloro benzene, monochloro toluene, trichloroethane, tetrachloroeth-

| Control | Pyridine/Palladium molar ratio | 2,4-dinitrotoluene Conversion (%) | Toluene 2,4-diisocyanate Yield (%) |
|---|---|---|---|
| 3 | 1 | 100 | 40.0 |
| 4 | 2 | 100 | 72.5 |
| 5 | 4 | 100 | 53.0 |
| 6 | 6 | 100 | 60.0 |
| 7 | 9 | 100 | 51.1 |

CONTROL 8

Into a 120 ml. of stainless steel (SUS 32) autoclave, there were charged 1.1 g. of 2,4-dinitro toluene, 0.16 g. of palladium dichloride, 0.28 g. of pyridine and 15.0 g. of benzene (the amount of palladium being 15 mol % based on 2,4-dinitro toluene; the amount of pyridine being 4 times of mols based on palladium), and then carbon monoxide with the pressure of 120 Kg/cm$^2$ at ane, trichlorotrifluoro ethane, perchloroethylene; and aromatic hydrocarbon such as benzene, toluene and xylene is used as a solvent.

6. A process according to claim 1, wherein aromatic nitro compound to be employed is mono- and polynitro benzene and isomer mixture thereof; nitroalkyl benzene and isomer mixture thereof; and bis(nitrophenyl) alkyl and isomer mixture thereof.

* * * * *